United States Patent [19]

Sabsay

[11] E Re. 29,259

[45] Reissued June 7, 1977

[54] SELF RE-KEYING SECURITY DEVICE

[76] Inventor: Daniel M. Sabsay, 329 Harvard St., No. 31, Cambridge, Mass. 02139

[22] Filed: June 28, 1965

[21] Appl. No.: 700,554

Related U.S. Patent Documents

Reissue of:

[64] Patent No.: 3,821,704
Issued: June 28, 1974
Appl. No.: 351,298
Filed: Apr. 16, 1973

[52] U.S. Cl. ..... 340/149 A; 340/149 R; 340/274 C

[51] Int. Cl.² ..... H04Q 3/00

[58] Field of Search ..... 340/149 A, 149 R, 274 C; 317/134; 235/61.7 B

[56] References Cited

UNITED STATES PATENTS 3,727,187 4/1973 Norwich ..... 340/149 A

*Primary Examiner*—Harold Pitts

[57] ABSTRACT

A security system for use in secure areas, buildings, hotels, automobiles and so forth. Each lock mechanism is controlled by a decoding circuit having a changeable binary memory. A basic key has two decodable information fields: a key field and an authorization field. When a key field is sensed by the decoding circuit and found to contain a number equal to the combination previously stored in the decoding circuit memory, the lock mechanism is opened. If the comparison does not find a match, the authorization field number and the combination are then compared. If they are found to be equal, the decoding circuit memory changes itself to the number found in the key field and the lock mechanism opened. In this way, lock combinations may be changed. In addition, the key may contain other information fields, such as various levels of master combinations, key insertion information, and so forth.

21 Claims, 8 Drawing Figures

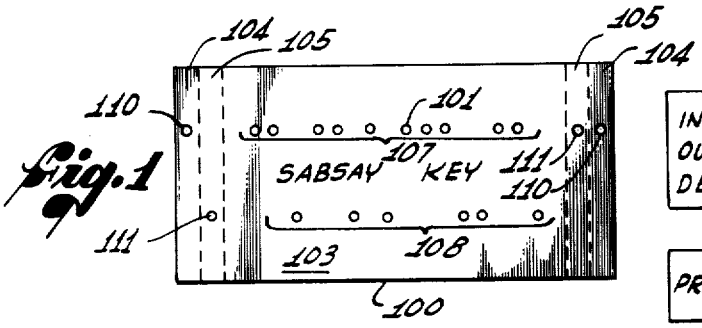
Fig. 1
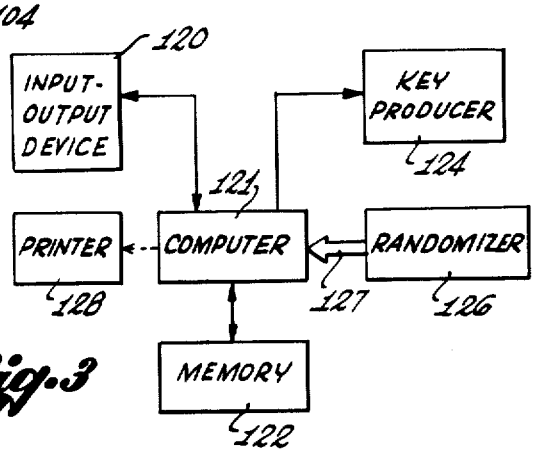
Fig. 3
Fig. 2
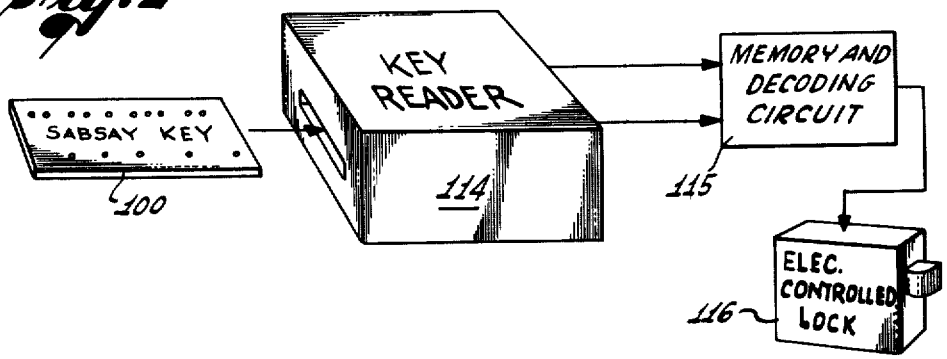
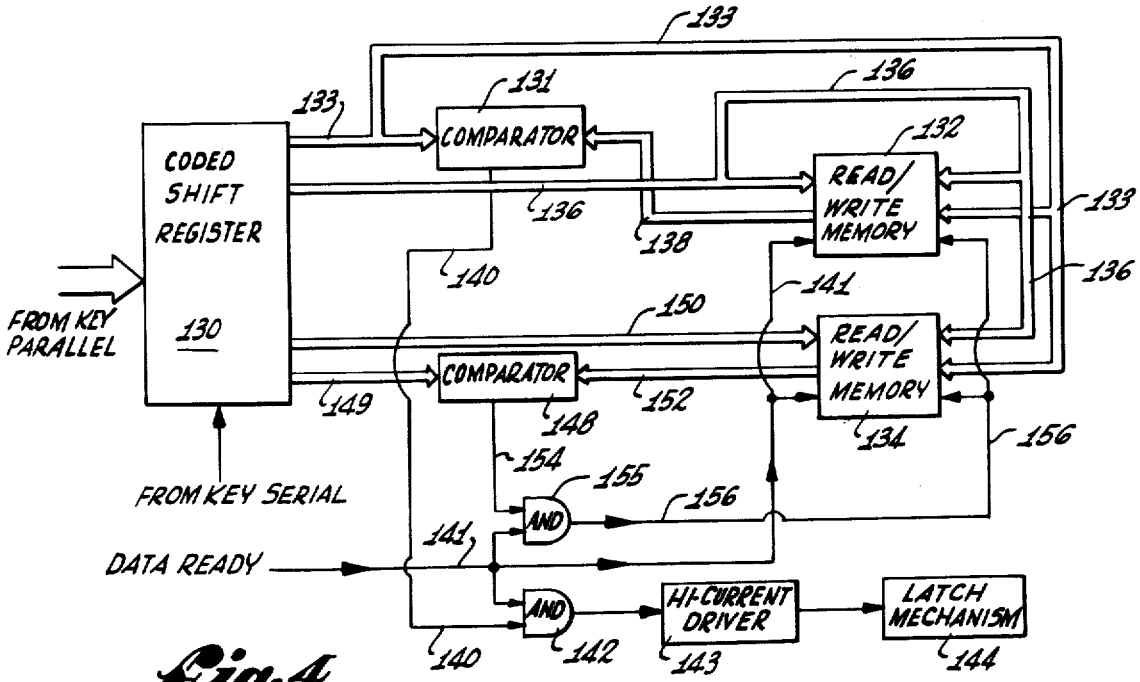
Fig. 4

SELF RE-KEYING SECURITY DEVICE

Matter enclosed in heavy brackets [ ] appears in the original patent but forms no part of this reissue specification; matter printed in italics indicates the additions made by reissue.

This is a continuation of application Ser. No. 234,157, filed Mar. 13, 1972 now abandoned.

BACKGROUND OF THE INVENTION

This invention relates to code responsive logic circuits for operation of lock mechanisms.

There are many applications which require complex and changeable lock systems. For example, in large hotels it is the current practice to provide each room with a standard mechanical tumbler lock. A guest is provided with a key which matches only the lock to the room he is assigned. As keys are lost or taken inadvertently, new keys must be made, which is a time consuming and costly operation. Further, theft poses a very substantial problem. It is often necessary to change or re-key door locks when it is suspected that keys may have fallen into unauthorized hands.

A further complication in such a system is imposed by the usual necessity of a number of levels of master keys. In a hotel, for example, a maid must be provided with a master key which unlocks rooms she serves; for security reasons, however, it is generally desirable to provide her with a master key which opens only the rooms to which she is assigned and no others. A supervisor of maids may be given a higher level master key which opens the rooms assigned to all persons under her supervision. Still higher level master keys may be given to hotel personnel, each for opening all doors in a large section of the hotel in case of fire. Finally, there may be a highest level master key which will open all doors.

It may be seen, then, that the requirement of a number of levels of master keys and the recurrent need to change individual door locks or groups of door locks to control theft presents a very substantial problem. Skilled locksmiths must be employed on a virtually constant basis. Because of the cost and time involved in changing locks, however, there is a resulting reluctance to make such changes. As a consequence, security against unauthorized entries and thefts is often lessened.

The problems encountered in the example given are found in any present security system in which standard mechanical locks are used. The application of the system and the types of master levels involved may vary, but the problems remain.

A number of electrically controlled systems have been proposed to meet some of the problems mentioned above. The simplest type uses a decoding device mounted adjacent to each door lock which may be pre-set. A binary combination number is set into each device by, for example, simple switches. A user operates a push-button key switch or inserts a card-type key on which a number is binarily encoded. If a comparison between the entered key number and the previously stored combination number finds the numbers equal, the door is unlocked.

Such a system is an improvement over the mechanical lock systems described above in that each door lock may be more easily changed or re-keyed. However, to change a combination, each door lock must be opened by security personnel as with a mechanical system. Further, such systems have no provision for various levels of master keys or combinations. Also, since most such systems protect the re-keying switches with a mechanical lock, many of the above problems remain.

Another type of electrically controlled system utilizes similar key and decoding hardware, but transmits entered key combinations to a central location where they may be checked by a computer. If the entered combination is a proper one, the lock is opened under computer control.

A further type similar to the centrally controlled system described above controls a change in a door combination when a new key is issued. In this system, the new combination is transmitted to a door lock memory device as the key is produced.

The disadvantage to the centrally controlled type of system is that the control device must be connected by cables to each lock. While this is reasonable in a small system, its use in a large building complex or in any application requiring a greater number of controlled locks is very expensive. Also, in both large and small installations, connecting cables are vulnerable to tampering. Moreover, such a system cannot be used in any application where direct connection with a controlled lock is impossible, as in a fleet of vehicles. Further, as the numbers of controlled locks grow, larger central computers and, in some instances, multiplexing systems, are required which also greatly increases system costs.

SUMMARY OF THE INVENTION

In the invention disclosed and claimed herein, each lock is controlled by a decoding device which includes a resettable memory. In its simplest form, the memory is preset with a multi-digit combination. Each time a key is used, at least two numbers are entered: a key number and an authorization number. If the key number is found to match the combination previously stored in the memory, the lock is opened. If they are found not to match, a comparison is made between the entered authorization number and the previously stored combination. If the comparison finds them equal, the decoding device memory is reset to the entered key number, the first comparison step is repeated and the lock is opened. In this way, the lock is automatically re-keyed without the intervention of skilled workmen. To change a lock combination automatically, all that is necessary is to encode a newly issued key with a new key number and also encode the last key number used.

The advantages of this invention may be easily seen by considering its application to the hotel example described above. When a guest registers for a room, he is given one or more key cards having at least two fields of information encoded thereon. One field, the key field, contains his new key number. The second, the authorization field, contains the number assigned to the last guest to use the room. Upon the first insertion of his key, the lock is automatically re-keyed to his new combination number. Thereafter, until the lock combination is changed, the only key number that will open his door is that assigned to the present guest. No prior guest keys will open the lock since the decoding circuit now contains a new key number.

Because the lock combination is stored in a memory accessible only by the logic circuit, the door locks may not be picked. Further, each lock is re-keyed without the intervention of anyone but the user. Finally, there is no interconnection of a central controller with each lock mechanism, which saves a considerable amount of installation cost and provides for use of these devices in mobile vehicles and isolated locations.

Further, provision is made in this invention for multi-levels of master keys. Each key encoded according to this invention contains a total of four information fields. In addition to the two fields discussed above, the key and authorization fields, two level number fields are encoded, one associated with each of the key and authorization fields.

Prior to the first use of the lock, the decoding circuit memory is loaded with as many different combination numbers as there are master levels. The level number associated with any particular key number determines which is the previously stored combination numbers the entered key number will be compared against.

Similarly, the level number associated with the entered authorization number determines which of the previously stored combination numbers the authorization will be compared against. Accordingly, if the level numbers associated with the key and authorization numbers are the same, which is the usual case, only the combination number on the same master level as the entered authorization number may be changed. In some instances, however, it is desirable to "cross load" the decoding circuit memory. In such a case, the entered authorization number may be utilized to change a combination on a different level than that assigned to the authorization number; the level number associated with the key number determines the combination to be changed. When "cross loading" is not desired, the key need only carry a single level number.

In a variation where level number fields are not present on the key, the lock may search its memory for the combination which matches. This provides for a situation where several locks are owned by different people but it is required that a single key open them all. Because each lock owner will allocate the memory's combination levels in his lock according to his own needs, the key used in common among these owners might need to activate the several locks by means of a combination stored in a different level in each lock.

Lastly, the invention provides for a field on the key which will cause the lock to suppress the latch opening function during the operation cycle which re-keys a level. This is useful when a master key is being changed; a visit to each lock will cause the lock to adapt to the new master key but the occupants of the room will not be disturbed. Subsequent use of this key in the adapted locks opens the door normally.

BRIEF DESCRIPTION OF THE DRAWINGS

FIG. 1 illustrates one form of a Sabsay key, the key utilized to operate lock mechanisms of this invention in its preferred embodiment.

FIG. 2 is an illustrative diagram showing a key and key reader which operate a latch mechanism through memory and decoding circuits.

FIG. 3 is a block diagram of the system that prepares the keys of this invention.

FIG. 4 is a block diagram of the invention, illustrating the memory and comparator devices.

DESCRIPTION OF THE PREFERRED EMBODIMENT

Figure 5:
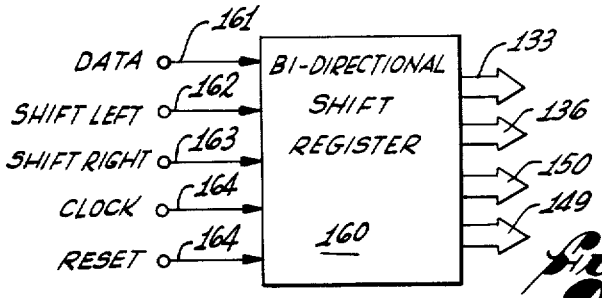
FIGS. 5 to 8 are logic circuits disclosing the operation of the coded shift register of FIG. 4.

Referring to FIG. 1, a key 100 for use with this invention is shown. In the preferred embodiment, the key 100 is made from plastic, of a type and size that may be easily carried and handled. In addition to the encoded information, key 100 may contain such matter as printing or pictorial data for use, for example, as advertising. Information may be encoded on card 100 in a variety of ways, such as magnetic spots or colored ink. In the preferred embodiment, information is encoded via punched holes or apertures 101.

The key 100 is comprised of three areas 103, 104, 105. The center area 103 contains two data tracks, a "1's" track 107 and a "0's" track 108. Together, the two data tracks contain four binary numbers, as will be discussed below. A single bit in the binary numbers is represented by a perforation in either one of the two tracks with no perforation in the other track. For example, a binary one is represented by a perforation in the "1's" track and no perforation in the opposite position of the "0's" track. A binary zero is represented by the opposite condition.

The coding areas 104 at the opposite ends of key 100 will always contain a perforation 110 in line with the "1's" track. The purpose of the perforations in the end areas 104 is to define the "1's" track so that the key may be read from either end. Similarly, areas 105 contain a perforation 111, for the purpose of defining the beginning end of the binary number. In this way, the key 100 may be inserted into the reader with either side up. Thus, there is no chance that a user can insert his key into a key reader the wrong way.

The center coding area 103 contains, in the preferred embodiment, four binary numbers: the key number and associated level number; the authorization number and associated level number. The key number is the binary number that will operate to open its corresponding lock. The authorization number is the binary number which will cause the key number to be loaded into the decoding circuit member, replacing the combination number previously found there. Level numbers determine the master level of both their associated key and authorization numbers. The significance and use of each of these numbers is best understood by reference to FIG. 2 and 3 and the above example of the use of this invention in a large hotel.

As shown in FIG. 2, each door lock is provided with a key reader 114, a memory and decoding circuit 115 and an electrically controlled lock 116. The key 100 is inserted by hand into reader 114. If it contains a key number matching the previously stored combination, memory and decoding circuits 115 cause the lock 116 to open.

In the preferred embodiment, four binary numbers, representing four levels of key and authorization numbers, are stored in the memory and decoding circuit 115. Keys to match at least one of the four numbers are prepared under computer control as shown in FIG. 3. In the hotel of the example, a check-in desk is provided with a keyboard input-output device 120. When a guest checks in the hotel, he is assigned a room, as in the usual course. The room number, request for a new key and level number is entered via the input-output device 120. The computer 121 receives the data and retrieves from its memory 122 the key number previously assigned to the last guest in the same room. The previous key number is transmitted to a key producer 124 which encodes the previous key number as the present authorization number along with the level number entered by the desk clerk. A randomizer 126, a high rate free-running counter, constantly generates changing binary numbers of the desired number of digits and presents them to computer 121 via parallel lines 127. The computer 121 transmits one of the random numbers, along with the selected level number, so the key producer 124 where it is encoded in the new key as the key number. To ensure uniqueness, the computer may check the random number against key numbers currently in use. The new key contains, then, a new key number selected completely at random, an authorization number retrieved by the computer which is the prior key number assigned to the same room and two level numbers entered by the clerk. The position bits are encoded in each card by the key producer. The newly prepared key is then presented to the guest.

When the guest inserts his new key into the key reader 114 (FIG. 2) located adjacent to his door lock, his new key number is first compared by the memory and decoding circuits 115 with the previously stored combination. The numbers do not match, so the door is not unlocked. Then, the authorization number from his key is compared to the previously stored combination. Since the computer 121 caused the key producer to enter the previously stored combination in the new key, a match is found. The memory and decoding circuits then control the new random key number to be entered into memory in place of the prior combination. The door is then unlocked since the stored combination matches the key number encoded on the guest's key. Thereafter, until a new key with a different key number is created for that lock, the door will be unlocked upon the first comparison since the key number encoded in the key and the combination contained in the memory match.

Accordingly, by use of this invention, the door lock combination may be changed each time a new guest is checked into a room. In this way, no risk of theft because of previously stolen or retained guest keys is encountered. Each guest may keep his key or discard it, as he wishes. In a different application, a secure industrial area, for example, new keys may be issued periodically or as prudence dictates so as to regularly change the combinations of all locks.

If a guest loses his key or wishes a duplicate, such keys may be readily produced on the key producer 124. For a duplicate key, the computer 121 is controlled to retrieve from its memory 122 the key number assigned to the present guest and transmit the appropriate numbers to the key producer. This may be controlled by appropriate software with only the entry of the room number, level number and duplicate key instruction into input-output device 120. A lost key is replaced with a key containing a new random key number as described above.

Referring still to the hotel example, a second master level of key may be used by a maid. If, for example, one maid was assigned to service ten rooms, the memory and decoding circuit would have stored the same combination in the location assigned to the maid's level. Her key, produced by the key producer 124, would remain unchanged as long as it was desirable. If she were to terminate her employment, for example, the ten rooms could be re-keyed at the maid's level by production of a new key. As explained above, the new key would be encoded with a new random key number and the prior key number as its authorization number. Use of the new key in the assigned locks would cause the re-keying of the ten rooms to the new random key number.

Similarly, a higher level key could be produced which would unlock all doors in a floor or wing of the hotel. The only difference between such a key and those described above is that it would be encoded as a different level key and would, thereby, access a different stored combination.

In like fashion, a fourth level key could be produced which would access yet a different previously stored combination to open every door in the hotel. And, as may be readily appreciated, as many levels of master keys could be employed as there are storage locations in the memory and decoding circuit 115.

The computer 121 is, in the preferred embodiment, programmed in obvious fashion to store in its memory 122 the present key numbers of all levels of all locks. This information is necessary to enable the locks to be re-keyed. When a new key number is selected from the randomizer 126, it is also stored in the computer's memory 122 as the present key number of the assigned room. A printer 128 is utilized to read out system administration information, as desired.

In the above example, description of this invention was made in terms of its application to a hotel with four levels of keys. As may be readily appreciated, the number of levels may vary as needed in the particular application. For example, use of the invention in a high security defense plant may require many more than four levels of keys. A change in the number of levels only requires a change in the number of storage locations for different combinations in the memory and decoding circuits.

The number of possible different combinations of key numbers determines, of course, the density of information encoded on the key as well as the number of bit storage locations required at each level. Such numbers are, of course, variable and are set by the requirements of the particular application.

The key reader 114 will take various forms dependent upon the type of key encoding employed. In the preferred embodiment, which utilizes a perforated key, the key reader is a standard light-photocell arrangement.

Signals transmitted from the key reader to the memory and decoding circuits 115, shown in detail in FIG. 4, may be in either parallel or serial form. The four binary numbers are loaded into a coded shift register 130 in the usual fashion. The key number from the decoded key is transmitted to a comparator 131 and two identical memory devices 132 and 134 over parallel lines 133.

The memory devices 132, 134 are standard units obtainable from the usual suppliers of such items. In the preferred embodiment, standard integrated circuit chips were used. Each is a read and write memory, having as many word storage locations as there are key levels. Each word storage location stores the number of bits which make up the key or authorization numbers. Both memory devices 132, 134 contain the same stored binary numbers.

The level number associated with the key number is presented to the word select (read) lines of memory device 132 and the word select (write) lines of both memory devices 132, 134 over parallel lines 136. When the level number is received by memory device 132, it serves as an address, causing the previously stored combination at the designated level to be read out to the comparator 131 over lines 138 after the memory device is enabled by line 141, as occurs when the entire key has been entered.

If the comparator 131 finds a match between the key number on lines 133 and the previously stored combination on lines 138, the comparator 131 turns on its output line 140. As will be explained below, a "data ready" logic signal is derived which turns on line 141, indicating that the entire key has been entered. Coincidence of the "on" state of the comparator output and the data ready lines, determined by AND gate 142, triggers a high current driver 143. The driver 143, in turn, operates a latch mechanism 144, causing the lock to be opened.

It may be seen, then, that if the key number read from the user's key matches the previously stored combination, the latch mechanism will be unlocked. A different sequence occurs, however, if the two numbers do not match. In the instance when a lock's combination is to be changed, as in the above example of a new hotel guest, the new key number on lines 133 was chosen completely at random and would not, therefore, match the prior combination. In such instances, however, the prior key number is encoded on the new key in a different location as the authorization number.

The decoded authorization number is transmitted to one side of comparator 148 over parallel lines 149. Its associated level number, which may or may not be the same level number appearing on lines 136, is supplied to the word select (read) lines of memory 134 over lines 150. When the memory device is enabled by the data ready line, the stored combination selected by the level number on line 150 is read out to comparator 148 over lines 152. If there is a match, the output line 154 of the comparator is turned on and AND'ed with the data ready line by AND gate 155. Detection of the coincidence turns on line 156 which is a write enable line to the memory devices 132, 134. This causes the new key number on lines 133 to be entered in both memory devices at the locations determined by the level number on lines 136.

Since the data ready line is still on, after the new key number is entered in the memory device 132, it is outputed to comparator 131. There, a match is found and the latch mechanism unlocked as described above.

As is readily obvious, if a key is inserted in the wrong lock, neither comparison step will find a match and the latch mechanism will not be unlocked.

Two memory devices are disclosed in FIG. 4. Since each stores the identical combinations, a single memory may be substituted, with the appropriate timing logic, without departing from this invention. Further, two comparators are shown which may, of course, be replaced by a single comparator. Again, appropriate timing logic would be required to present first the key number and then the authorization number to a single comparator.

While it is believed that the coded shift register is readily understandable from the above discussion of its operation in FIG. 4, a detailed diagram of its logic circuitry is disclosed in FIGS. 5 through 8.

Referring to FIG. 5, a bi-directional shift register 160 accepts four logic signals and a data input derived from the decoded key. The data input 161 is obtained by the logic circuit of FIG. 8 from the two key data tracks. The shift left input on line 162 and shift right input on line 163, derived by the logic of FIG. 7, determines which end of the shift register will be loaded first. This, in turn, is determined by which end of the key is first inserted into the key reader. The clock input on the fourth input line 164 is on each time a bit is sensed from either track of the key as it is inserted into the key reader. The clock signal is derived by logic of FIG. 8. The final input, a reset signal, is supplied on the fifth input line 165. Its function is to clear the shift register 160 after the comparisons are made. As explained in connection with the description of FIG. 4, the shift register 160 provides four outputs, the new key number on lines 133, the key level number on lines 136, the authorization number on lines 149 and the authorization level number on lines 150.

As shown in FIG. 4, the shift register is referred to as "coded." By this is meant that it is not necessary that all bit positions on the key for a single binary number be in adjacent locations in the shift register. For example, the new key number bits may be interspersed on the key with authorization number bits. The interspersal scheme is allowed for by the appropriate connection of output lines to the shift register output points. Such interspersal of number bits will aid the maintenance of security of the system by greatly increasing the difficulty of unauthorized production of keys.

The data ready signal line is turned on when the entire key has been read, the shift register is loaded and a comparison is to be made. In the preferred embodiment, the data ready signal, and other internal logic signals, are derived by the logic circuit disclosed in FIG. 6.

State 0 is defined as the reset state of the circuit. Accordingly, state 0 lines 170, 171 are on before the key is first inserted into the key reader. The output line 172 of AND gate 173 is off, however, since no other inputs are present.

As will be explained in connection with FIG. 8, a clock pulse is derived when each bit on a card is sensed. Accordingly, when the key is first inserted, the first bit will cause clock line 174 of FIG. 6 to turn on. AND gate 173 senses the coincidence between the previously existing state 0 and the first clock pulse, and pulses the counter 175 via OR gate 176 and counter input line 177. The counter 175, in turn, triggers binary to decimal decoder 179, causing the decoder to turn the state 0 line 170 off and the state 1 line 180 on.

AND gate 181 senses the coincidence of state 1 and the next clock pulse, and again pulses the counter 175 through OR gate 176 and the counter input line 177. The counter, in turn, causes binary to decimal decoder 179 to turn the state 1 line 180 off and turn the state 2 line 185 on. AND gate 188 has, then one input, the state 2 line 186, in an on condition. The second input, key-in, on line 187, indicates that the key has been fully read. Accordingly, the circuit of FIG. 6 remains in state 2 during the rest of the key insertion time. When the key-in line turns on, AND 188 gate pulses the counter 175, which in turn causes the binary decoder 179 to turn the state 2 line 185 off and turn on the data ready line 190. The memory circuits are then enabled and the comparison read enable lines steps begin. The circuit remains in this condition until it is reset via reset line 191.

Figure 7:
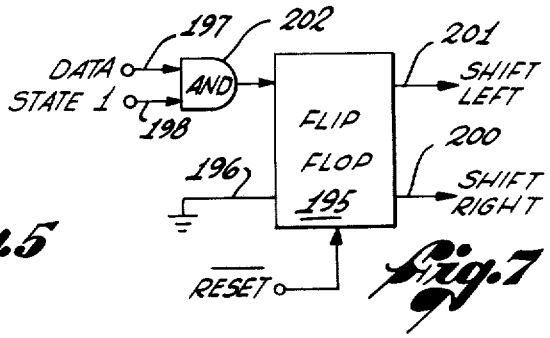
Figure 6:
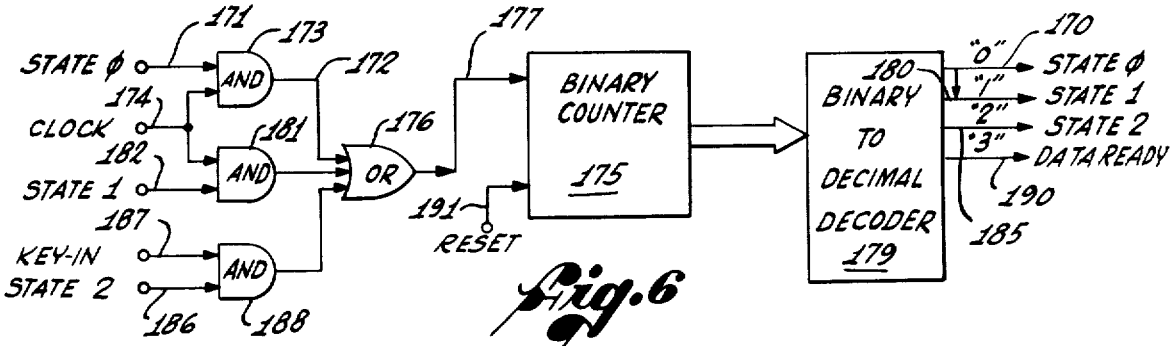

The logic of FIG. 7 determines whether the shift register 160 (FIG. 5) will load from the right or left side, depending upon which end of the key is first inserted into the key reader. Flip flop 195 is a standard J-K flip flop having one input grounded via line 196. The second input is the AND'ed result of the signals on the data line input 197 and the state 1 input line 198. If the data line does not turn on during state 1 time, shift right line 200 is turned on. If the data line turns on during state 1 time, the coincidence is detected in AND gate 202 which causes the shift left line 201 to be turned on, controlling the loading of the following data through the left end of the shift register. As explained above, the purpose of this is to allow insertion of either end of the key in the key reader.

Figure 8:
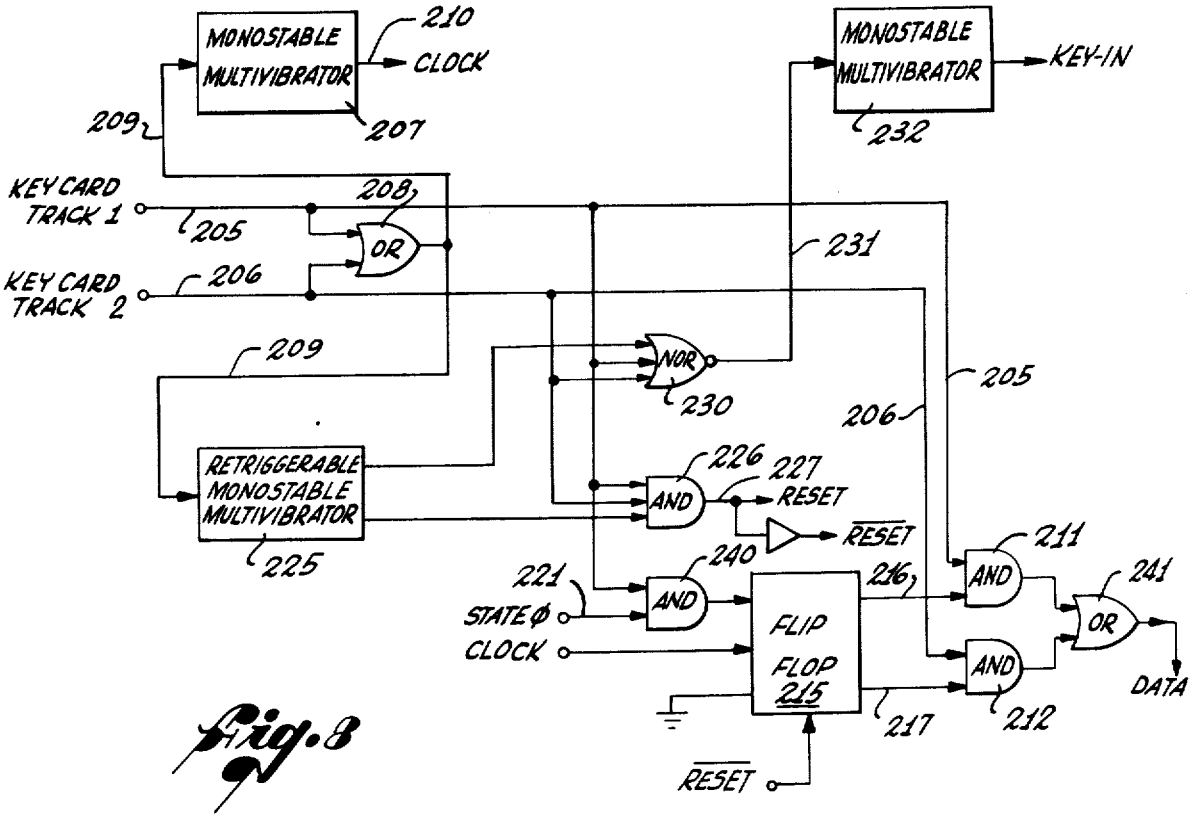

The data, clock, key-in and reset signals are derived, in the preferred embodiment, by the logic of FIG. 8. Each key has, in the preferred embodiment, two data tracks. As each data bit is received on the track 1 line 205 or the track 2 line 206, multivibrator 207 is pulsed via OR gate 208 and line 209. A clock pulse on output line 210 is, accordingly, produced during every sensed bit time.

The two data track signals each are supplied as one input to two AND gates 211, 212. The output of the two AND gates are OR'ed to form the data signal. Which AND gate is enabled, to provide the data signal, is determined by the first pulse sensed (110, FIG. 1) which identifies the "1's" data track. This is, of course, determined by the way the key is inserted into the key reader.

A flip flop 215 provides the controlling inputs to the two AND gates via its true and complement output lines 216, 217. Which of the AND gates is enabled is determined by the coincidence, or lack thereof, of a bit signal on line 205 during state 0 time when state 0 line 221 is turned on. This coincidence is sensed by AND gate 240. If a bit is sensed during this time (from perforations 110), line 216 is turned on and the bit signals on track 1 line 205 become the data signal. If no such coincidence is detected, line 217 remains on and the signals on track 2 line 206 become the data signal. OR gate 241 receives the selected track signals to deliver the data signals.

Each received data bit on either track is applied to retriggerable monostable multivibrator 225 via OR gate 208 and line 209. AND gate 226 is turned on, generating a reset signal on line 227, when no bits are received on either data line. The reset inverse signal is developed therefrom in usual fashion.

NOR gate 230 generates an output on line 231 only when its three inputs are off. A multivibrator 232 is turned on, supplying the key-in signal, when NOR output line is turned on.

As may be readily appreciated by those skilled in the art, the particular logic circuits may take many forms. This invention is limited only by the following claims.

I claim:

1. The method of operating security device, comprising the steps of entering into said security device a key number and an authorization number, comparing the key number with a combination number previously stored in said security device, operating said security device, if the compared numbers are found to match, comparing the authorization number with the combination number previously stored in said security device, if the key number was found not to match the combination number, causing the key number to be stored in said security device in place of the previously stored combination number, if the authorization number was found to match the combination number, and, operating said security device, if the authorization number was found to match the combination number.

2. The method of claim 1, wherein said step of operating the security device if the authorization number was found to match the combination number comprises the steps of comparing the entered key number with the number stored in place of the previously stored combination number and operating said security device if the numbers are found to match.

3. The method of claim 1, wherein said entering step further includes the step of entering two combination identification numbers, each of said combination identification numbers associated with one of said key or authorization numbers.

4. The method of claim 3, further comprising the step of first storing a plurality of combination numbers of said security device, and, wherein said step of comparing the key number with a combination number previously stored includes the step of selecting the combination number to be compared from the plurality of such numbers on the basis of the combination identification number associated with said key number.

5. The method of claim 3, further comprising the step of first storing a plurality of combination numbers in said security device, and, wherein said step of comparing the authorization number with the combination number previously stored in said security device includes the step of selecting the combination number to be compared from the plurality of such numbers on the basis of the combination identification number associated with said authorization number.

6. The method of claim 1, wherein said step of entering comprises the step of decoding said numbers from information encoded on a user's key.

7. The method of operating an [electrically] controlled security device, comprising the steps of retrievably storing a plurality of combination numbers in said security device, decoding from information encoded on a user's key a key number and an associated first combination identification number and an authorization number and an associated second combination identification number, comparing the key number with a particular one of said combination numbers determined by said first combination identification number, operating said security device, if the compared numbers are found to match, comparing the authorization number with a particular one of said combination numbers determined by said second combination identification number, if the compared key number and combination number were found not to match, causing the key number to be stored in said security device in place of the combination number selected by said first combination identification number, if the compared authorization number and combination number were found to match, and, operating said security device, if the compared authorization number and combination number were found to match.

8. The method of claim 7, wherein said step of operating said security device if the compared authorization number and combination number were found to match, comprises the steps of comparing the key number with the number stored in place of the combination number selected by said first combination identification number and operating said security device if the numbers are found to match.

9. The method of operating an [electrically] controlled security system comprised of a plurality of security devices, comprising the steps of storing a plurality of combination numbers in each of said security devices, decoding from a user's key a key number and associated first combination identification number and an authorization number and associated second combination identification number, comparing the key number with the one of said stored combination numbers selected by said first combination identification number, operating one of said security devices, if the numbers are found to match, comparing the authorization number with the one of said stored combination numbers selected by said second combination identification number, if the key number was found not to match the selected combination number, causing the key number to be stored in said security device in place of the one of said stored combination numbers selected by said first combination identification number, if the authorization number was found to match the selected combination number, and, operating said security device, if the authorization number was found to match the selected combination number.

10. The method of claim 9, wherein said step of operating said security device if the authorization number was found to match the selected combination number includes the steps of comparing the key number decoded from the user's key with the number stored in the location of the combination number selected by said first combination identification number and then operating said security device.

11. In a security device for [electrically] controlling a lock, said security device having stored therein at least one combination number, [for operating said device,] *comprising:* means for entering a key number and an authorization number into said security device, means for comparing said key number with [one of] said [stored] combination [numbers] *number and for comparing said authorization number with said combination number if said key number is found not to match said combination number,* means for operating said security device if said key number is found to match said combination number *and for operating said security device if said authorization number is found to match said combination number and said key number is found not to match said combination number, and*

[means for comparing said authorization number with said combination, if the key number is found not to match said combination number,]

means for storing the key number in said security device in place of said combination number, if the authorization number [was] *is* found to match said combination number [, and,]

[means for operating said security device if the authorization number was found to match said combination number].

12. The combination of claim 11, wherein said security device comprises means for retrievably storing a plurality of combination [ number ] *numbers*, and, said entering means comprises means for entering a first combination identification number associated with said key number and a second combination identification number associated with said authorization number.

13. The combination of claim 12, wherein said means for comparing said key number with one of said combination numbers *and for comparing said authorization number with said combination number if said key number is found not to match said combination number* includes means for selecting for said comparison a particular one of said plurality of combination numbers as determined by said first combination identification number.

14. The combination of claim 12, wherein said means *for comparing said key number with said combination number and* for comparing said authorization number with one of said combination numbers *if said key number is found not to match said combination number* includes means for selecting for said comparison a particular one of said plurality of combination numbers are determined by said second combination identification number.

15. The combination of claim 11, wherein said key number storing means retrievably stores said key number in the location of the combination number determined by said first combination identification number.

16. The combination of claim 11, wherein said means for operating said security device *if said key number is found to match said combination number and for operating said security device* if the authorization number [was] *is* found to match said combination number *and said key number is found not to match said combination number* comprises means for comparing the key number with the number stored in place of the previously compared combination number and then operating said security if the numbers match.

17. The method of operating an [electrically] controlled security system comprised of a plurality of security devices, each of said devices operable by entry of an assigned key number, comprising the steps of storing at least one combination number in each of said security devices, controlling a computer to retrieve from its memory the combination number previously stored in a designated one of said security devices, controlling said computer to obtain a [randomly valued] *selected* number and store said number in the memory in place of the retrieved number, producing a key encoded with said retrieved combination number as an authorization number and said [randomly valued] *selected* number as a key number, decoding from the key said key number and said authorization number and entering said numbers into said designated security device, comparing said key number with said previously stored combination number, operating said designated security device, if the numbers are found to match, comparing the authorization number with the combination number previously stored in the security device, if the key number was found not to match the combination number, causing the key number to be stored in said designated security device in place of the previously stored combination number, if the authorization number was found to match the combination number, and, operating said designated security device, if the authorization number was found to match the combination number.

18. The method of operating a security device comprising the steps of storing a plurality of combination numbers in said security device, entering into said security device a key number, an authorization number, and two combination identification numbers, each of said combination identification numbers being associated with one of said key or authorization numbers, comparing said key number with one of said combination numbers previously stored in said security device, selected on the basis of the combination identification number associated with said key number, operating said security device, if the compared numbers are found to match, comparing said authorization number with one of said combination numbers previously stored in said security device, selected on the basis of the combination identification number associated with said authorization number, if said key number was not found to match said combination number, causing said key number to be stored in said security device in place of a previously stored combination number, said combination number being replaced being selected on the basis of the combination identification number associated with said key number, if said authorization number was found to match the combination number with which it was compared, operating said security device, if the authorization number was found to match the combination number with which it was compared.

19. The method of operating a security device comprising the steps of retrievably storing a plurality of combination numbers in said security device, entering into said security device a key number, an authorization number, and a combination identification number, comparing the key number with a particular one of said combination numbers determined by the combination identification number, operating said security device, if the compared numbers are found to match, comparing the authorization number with said particular combination number, if the key number was found not to match the selected combination number, causing the key number to be stored in said security device in place of said previously stored particular combination number, if the authorization number was found to match said particular combination number, and, operating said security device, if the authorization number was found to match said particular combination number.

20. The method of operating a security device comprising the steps of retrievably storing a plurality of combination numbers in said security device, entering into said security device a key number and an authorization number, comparing the key number with all combination numbers previously stored in said security device, operating said security device, if any of the compared combination numbers are found to match said key number, comparing the authorization number with all combination numbers previously stored in said security device, if no combination numbers were found to match the key number, causing the key number to be stored in said security device in place of the previously stored combination number which matched the authorization number if such a match occurred, and, operating said security device, if the authorization number was found to match any of the stored combination numbers.

21. The method of operating security device, comprising the steps of entering into said security device a key number and an authorization number, comparing the key number with a combination number previously stored in said security device, operating said security device, if the compared numbers are found to match, comparing the authorization number with the combination number previously stored in said security device, if the key number was found not to match the combination number, causing the key number to be stored in said security device in place of the previously stored combination number, if the authorization number was found to match the combination number.

* * * * *